United States Patent [19]

Hayashi et al.

[11] Patent Number: 4,726,258
[45] Date of Patent: Feb. 23, 1988

[54] DUAL TRANSMISSION SYSTEM AND ITS POWER SHIFT MECHANISM

[75] Inventors: Tsutomu Hayashi; Masaie Katoh, both of Tokyo, Japan

[73] Assignee: Honda Giken Kogyo Kabushiki Kaisha, Tokyo, Japan

[21] Appl. No.: 870,205

[22] Filed: Jun. 3, 1986

[30] Foreign Application Priority Data

Jun. 7, 1985 [JP] Japan .................. 60-123957
Jun. 7, 1985 [JP] Japan .................. 60-123958

[51] Int. Cl.⁴ .......................................... F16H 37/04
[52] U.S. Cl. .................... 74/740; 74/337.5; 74/474
[58] Field of Search .......... 74/740, 781 R, 474, 74/337.5

[56] References Cited

U.S. PATENT DOCUMENTS

| | | | |
|---|---|---|---|
| 2,426,593 | 9/1947 | Buckendale | 74/781 R X |
| 2,620,899 | 12/1952 | Swift | 74/781 R X |
| 2,663,199 | 12/1953 | Harrison | 74/740 X |
| 2,783,661 | 3/1957 | Dryer | 74/781 R |
| 2,923,176 | 2/1960 | Randt | 74/740 |
| 2,926,543 | 3/1960 | Holdeman et al. | 74/740 X |
| 3,590,660 | 7/1971 | Bopp | 74/781 R |
| 4,455,884 | 6/1984 | Tsuruta et al. | 74/337.5 X |

FOREIGN PATENT DOCUMENTS

| | | | |
|---|---|---|---|
| 2150674 | 4/1973 | Fed. Rep. of Germany | 74/740 |
| 126149 | 9/1980 | Japan | 74/337.5 |
| 121339 | 7/1983 | Japan | 74/337.5 |
| 207551 | 12/1983 | Japan | 74/740 |
| 86734 | 5/1984 | Japan | 74/337.5 |
| WO83/00200 | 1/1983 | PCT Int'l Appl. | 74/781 R |

Primary Examiner—Leslie Braun
Assistant Examiner—Dwight G. Diehl
Attorney, Agent, or Firm—Sughrue, Mion, Zinn, Macpeak, and Seas

[57] ABSTRACT

A transmission system including a main transmission and an auxiliary transmission. The main transmission includes at least two transmission trains of multiple gears mounted on respective parallel shafts so that the gears of different trains are selectively engageable. The auxiliary transmission includes a planetary system having an offset pinion gear, mounted on a carrier, engaged between an inner gear and an internally toothed outer gear. The carrier, inner gear and outer gear are coaxial with one of the shafts of the main transmission. The planetary gear system can be controlled so as to fix the rotation of the inner gear or to rotationally link the inner gear to the carrier, thereby providing two speed steps. All the shifting is controlled by one shifting drum.

5 Claims, 5 Drawing Figures

DUAL TRANSMISSION SYSTEM AND ITS POWER SHIFT MECHANISM

BACKGROUND OF THE INVENTION

1. Field of the Invention

The present invention relates to a transmission system having an auxiliary transmission for use in two- or three-wheeled motorcycles. The invention also relates to a transmission system having main and auxiliary transmissions, wherein transmission operations for both the main and auxiliary transmissions are performed by the same power shift mechanism.

2. Background Art

As a conventional transmission system for motor bicycles, motor tricycles, or the like, a transmission system is most generally used in which two rows of shafts for mounting multi-stage gears are disposed in parallel to each other to thereby cause mutually facing gears to normally engage with each other. In the this system, the rotation of an engine power shaft is transmitted to the drive wheels such as the vehicle rear wheels by the suitable selection of combinations of gears to change or maintain the speed.

Generally, the tansmission system for very efficiently utilizing the motive power characteristics of the engine in accordance with the running conditions of the engine. Accordingly, as the demand for higher performance motorcycles becomes stronger, a trend exists to further improve the running performance by changing the speed in smaller steps and by increasing the number of available gear ratios. To satisfy this trend, high performance transmissions have increased the number of gears by using multiple stages of gearing or an auxiliary transmission is serially connected to the conventional transmission system, which is then regarded as the main transmission.

Problems occur in both of these cases. In the former case, the problem is that the width of the transmission system becomes large because of the increase in gears (the gear shafts are arranged transversely) and the addition of incidental shifting equipment. In measuring running performance, the bank angle is one of the important factors for motorcycles. This bank angle is the maximum angle at which the cycle can be inclined. The larger the bank angle, the more the center of gravity in the cycle body can be lowered and the more the turning performance can be improved, so that handling becomes more comfortable. However, the transmission system is generally disposed in the vicinity of the bottom of the cycle body, and therefore in order to make the bank angle large it is necessary to reduce the width of the transmission system as much as possible. It is difficult however to reduce the width of the conventional multi-stage gearing type transmission system, because many gears must be disposed in the transverse direction. Consequently, the more the number of gears per shaft increases, the more difficult it becomes to secure the necessary bank angle. Furthermore, as the number of gear stages increases, the weight of the cycle body increases, resulting in a reduction in measure of running performance such as acceleration, fuel efficiency, etc., as well as an increase in cost.

In the latter case, i.e., in the case of the additional provision of an auxiliary transmission, it is necessary to connect at least one new gear mounting shaft in parallel to the conventional main transmission. Accordingly, the overall size of the transmission system composed of the main and auxiliary transmissions becomes large in the lengthwise direction. Consequently, the weight increases because of the enlarged size of the transmission system. Thus, this system is disadvantageous in view of cycle body layout, running performance, cost, etc.

In the case where an auxiliary transmission was additionally provided, individual operation members were provided respectively in the main and auxiliary transmissions, and were actuated independently of each other. For example, the speed change operations of the main and auxiliary transmissions were performed with the foot and the hand respectively.

Moreover, in the prior art, if the main and auxiliary transmissions both include separate speed change operation members and the operation members are actuated independently of each other, the independent actuations require independent use of the foot and hand, which is difficult for the driver. In addition, it is almost impossible to select and determine the respective speed change positions for the main and auxiliary transmissions which provide the optimum combination. Accordingly, sometimes, the capability of the auxiliary transmission cannot be sufficiently utilized.

SUMMARY OF THE INVENTION

Accordingly, an object of the present invention is to realize a multi-stage transmission system which is narrow in width, small in size in the lengthwise direction, and light in weight.

Another object is to provide such a transmission system in which operation members for performing speed changing operations respectively in the main and auxiliary transmissions are actuated by one and the same shifting mechanism.

In order to attain the foregoing objects, according to an aspect of the present invention, the transmission system comprises a main transmission which has a plurality of gear sets each composed a plurality of coaxially mounted gears. The gear sets are disposed in parallel to each other so as to make the mutually facing gears engageable with each other. The system also includes an auxiliary transmission which is coaxially connected with the main transmission and which includes a planetary gear mechanism constituted of an internally toothed gear, a sun gear disposed inside the ring gear coaxially therewith, a pinion gear disposed between the sun gear and the ring gear for engagement therewith, and a carrier for supporting the pinion gear.

The multi-stage gear-type transmission and the auxiliary transmission including the planetary gear mechanism are connected to each other, and the speed change operation members located respectively in the main and auxiliary transmissions are actuated by one and the same shifting mechanism. Accordingly, by actuating only the one shifting mechanism, it is possible to actuate the respective speed change operation members that are interlocked with each other. Thus, the respective speed change positions of the main and auxiliary transmissions can be combined in a predetermined sequence to allow the orderly performance of speed change shifting.

Since a multi-stage gear-type main transmission is connected to an auxiliary transmission having a planetary gear mechanism, the number of available gear ratios in the combination becomes equal to twice the number of stages in the main transmission. The planetary gear mechanism can be locked up to provide an equal speed stage for each main transmission stage.

Accordingly, when the main and auxiliary transmissions are operated suitably in combination, the speed can be changed over multiple stages.

DETAILED DESCRIPTION OF THE PREFERRED EMBODIMENTS

Figure 1:
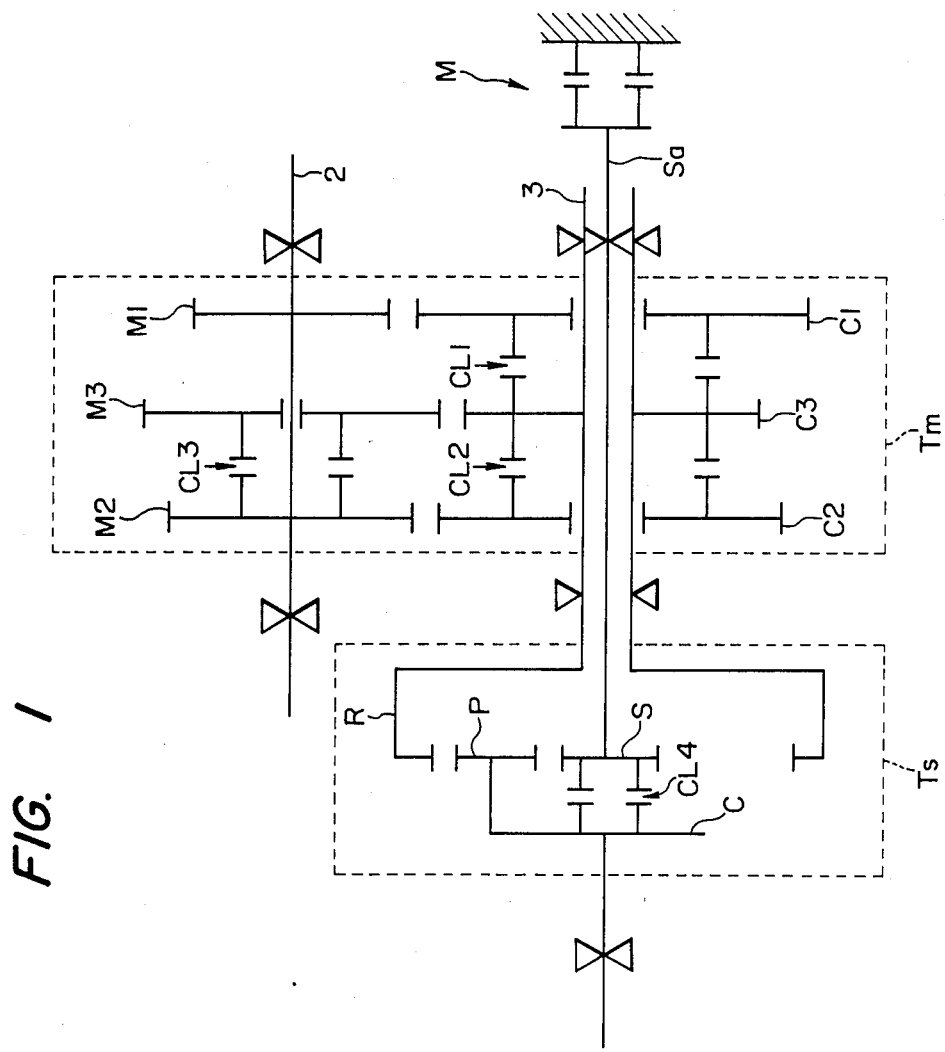
FIG. 1 is a schematic diagram of the transmission system.

FIG. 1 is a schematic diagram showing an embodiment of the motorcycle transmission system according to the present invention. In the drawing, the transmission system comprises a conventionally known, normally interlocked type three-stage main transmission Tm. It further includes an auxiliary transmission Ts connected thereto.

The main transmission Tm is composed of spur gears combinable in three stages and arranged in two clusters and has a main shaft 2 which is a first gear shaft and a counter shaft 3 which is a second gear shaft. In a crank case (described later), the main shaft 2 is disposed in parallel with a crankshaft (not-shown) at the rear side of the crank shaft. The term "rear" as used herein is defined based on the direction of power transmission and this convention applies to the description relating to directions as described hereafter. The counter shaft 3 is also disposed in parallel with the crank shaft at the rear side of the main shaft 2. Gears M1, M2 and M3 are mounted on the main shaft 2, and gears C1, C2 and C3 are mounted on the counter shaft 3 so that the gears C1, C2 and C3 respectively engage with the gears M1, M2 and M3, the different pairs producing different gear ratios. Clutches CL1, CL2 and CL3 are provided between the gears C1 and C3, between the gears C2 and C3, and between the gears M2 and M3, respectively. The clutches are suitably turned on and off to change the combination of gears to thereby select one of plural motive power transmission passages of different transmission gear ratios.

The auxiliary transmission Ts is composed of a planetary gear mechanism having an internally toothed ring gear R, a pinion gear P, a carrier C for supporting the pinion gear P, and a sun gear S. The sun gear S is a ring gear toothed both internally and externally. The internal teeth act as splines. The ring gear R is rigidly connected to one end of the counter shaft 3 to form an input portion, and the carrier C is rigidly connected to an output shaft. The sun gear S is selectively located at one of two positions (of LOW and HIGH) where it is either stationary or connected to the carrier.

Figure 2:
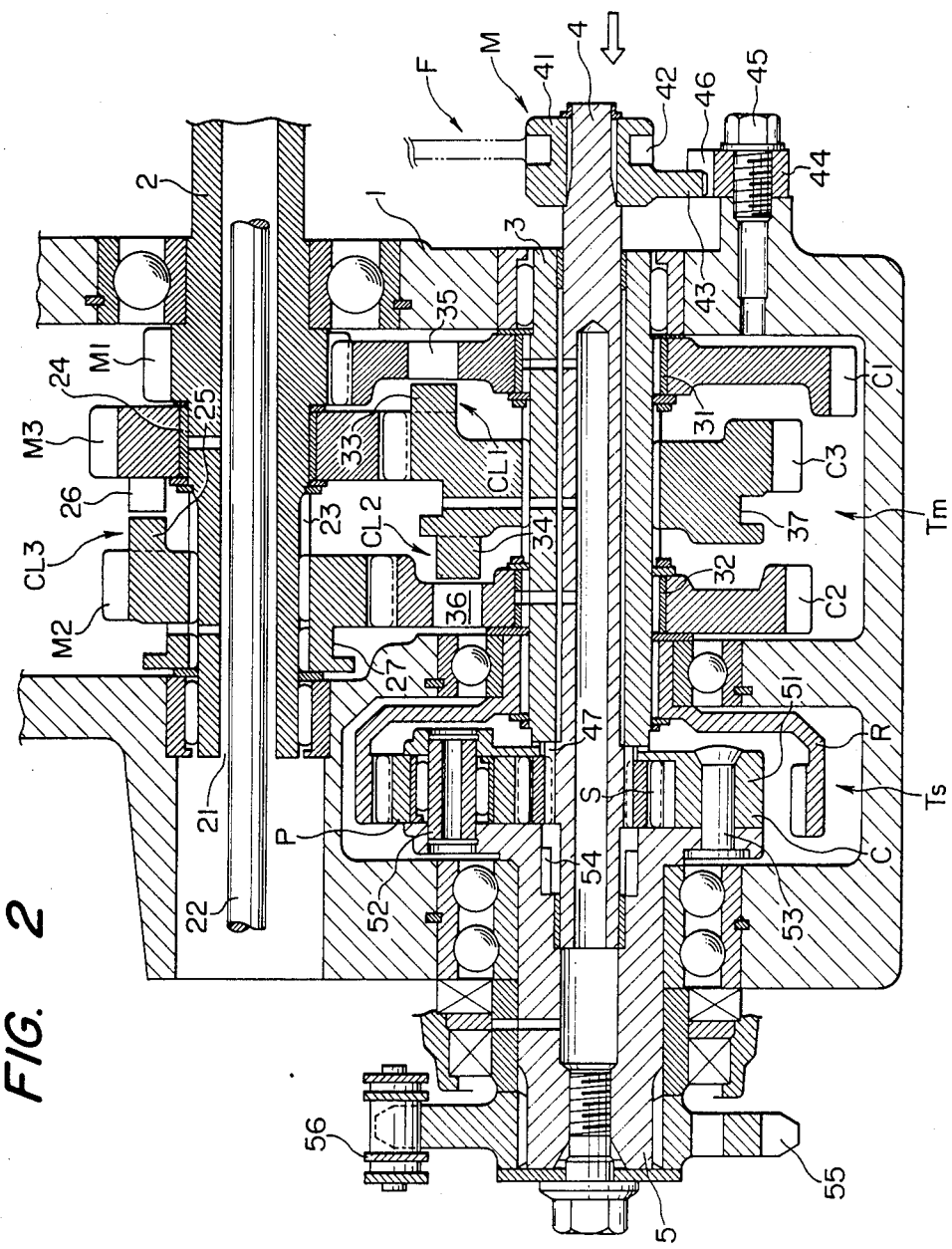
FIG. 2 is a sectional view thereof.

FIG. 2 is a sectional view illustrating the details of this embodiment. Both the main transmission Tm and the auxiliary transmission Ts are housed in the crank case 1.

MAIN TRANSMISSION

The main transmission Tm has the main shaft 2, the counter shaft 3, the clutches CL1, CL2 and CL3 for selectively connecting or disconnecting a plurality of gears mounted on the shafts, and the like. The main shaft 2 is a hollow shaft provided with a through hole 21 formed at the center thereof. A rod 22 connected to the main shaft 2 for turning on/off a clutch (not shown) located at the output side of the engine, is inserted into the through hole. The rod 22 is arranged to turn off the clutch when an outwardly projecting end thereof is pushed by means not shown.

The three gears M1, M2 and M3 are mounted on the main shaft 2, the respective numbers of the teeth of the gears M1, M2 and M3 being in the order of M3>M2>M1. The gear M1 is directly connected to the main shaft 2, and the gear M2 is spline-connected to splines 23 formed at the top of the main shaft 2. The gear M3 is rotatably mounted through a bearing 24 between the gears M1 and M2 so that the gear M3 can rotate on the main shaft 2. Projections 25 and 26 facing each other are formed on the respective sides of the gears M2 and M3 to thereby constitute a dog clutch CL3 for causing the gears M2 and M3 to engage each other when the gear M2 is moved toward the gear M3 by the shift mechanism (not shown). In addition, the gear M2 is provided with a fork groove 27 with which a well known shift fork (not shown here) is engaged.

The counter shaft 3 is a hollow shaft on which the three gears C1, C2 and C3 are mounted so as to be in opposition to the gears M1, M2 and M3, respectively. The respective numbers of the teeth of the gears C1, C2 and C3 are in the order of C1>C2>C3. The gear C3 is spline-connected to the counter shaft 3 and the gears C1 and C2 are rotatably mounted on the counter shaft 3 through bearings 31 and 32. The gear C3 is disposed between the gears C1 and C2 and is provided with projections 33 and 34 projecting from the side of the gear C3 toward the gears C1 and C2. Corresponding to the projections 33 and 34, holes 35 and 36 are formed at the respective sides of the gears C1 and C2. The projections and holes constitute the dog clutches CL1 and CL2. In addition, the gear C3 is provided with a fork groove 37 with which a known shift fork is engaged.

The operation of the main transmission will be described hereinafter. First, in the case of the first gear change, the above-mentioned shift fork engages the fork groove 37 and is moved to cause the projection 33 to engage with the hole 35, so that the clutch CL1 is engaged. Accordingly, the rotational motive power exerted onto the main shaft 2 is greatly reduced through the passage of main shaft 2→gear M1→gear C1→gear C3→counter shaft 3. The case of the second speed change or the like is similar to this case. For example, in the case of the second or third speed change, the corresponding clutch CL2 or CL3 is engaged in the same manner as the previous case. The motirve power passages in those cases are as follows:

Second Speed Change: main shaft 2→gear M2→gear C2→gear C3→counter shaft 3

Third Speed Change: main shaft 2→gear M2→gear M3→gear C3→counter shaft 3

AUXILIARY TRANSMISSION

The auxiliary transmission Ts is constituted by a planetary gear mechanism having an internally tooth ring gear R, a pinion gear P, a carrier C for supporting the pinion gear P, and a sun gear S for engaging with the pinion gear.

The sun gear S is connected to the top end of the operation shaft 4 which is inserted into and supported by the hollow portion of the counter shaft 3. The operation shaft 4 is arranged to be axially slidable and circumferentially rotatable within the hollow portion of the counter shaft 3. One end of the operation shaft 4 projects outwardly from the crank case 1 and has a sun gear operating mechanism M at this projected end.

Figure 3:
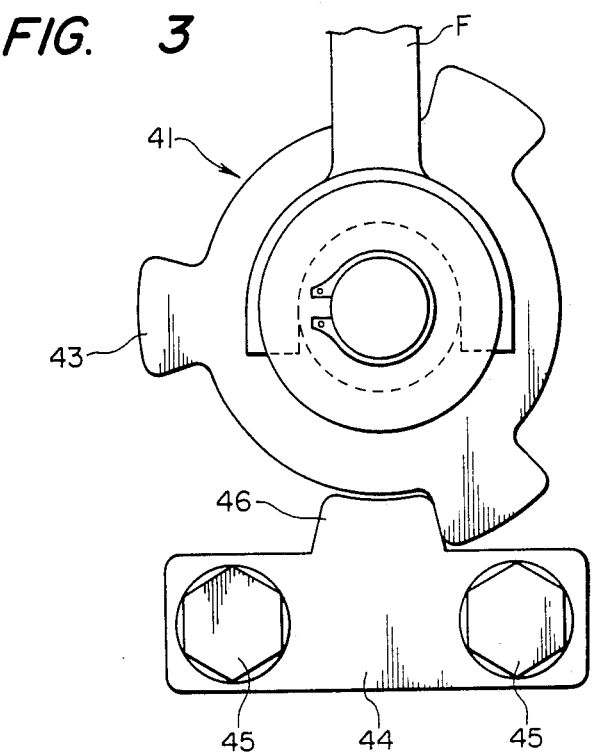
FIG. 3 is a partially plan view of the sun gear operating mechanism M.

The sun gear operating mechanism M has an engaging wheel 41, a stopper 44, and other elements so that it can set the sun gear S to stop the rotation of the operation shaft 4 or can release the sun gear S to allow the operation shaft 4 to rotate. In reference to FIGS. 2 and 3, it is apparent that the engaging wheel 41 is spline-connected to the end of the operation shaft 4, is shaped to be substantially circular, and has fork groove 42 formed on its circumference. The fork groove engages with an operation member such as a shift fork F having a fork end. Its movement causes the operation shaft 4 to move axially. Furthermore, a plurality of engaging teeth 43 are formed to radially outwardly proeject from the circumference of the operation shaft 4 at equal intervals. The stopper 44 is disposed adjacent to the engaging wheel 41 to enable one of the engaging teeth 43 to engage with the stopper 44 at a position (called the stationary position), as shown in FIG. 2, in which the operation shaft 4 moves away from the inside of the crank case 1 (to the right in FIG. 2). The stopper 44 is fixed to the side of the crank case 1 by a bolt 45 or the like, and has a side portion projecting toward the engaging wheel 41 to form an engaging projection 46. The stopper 44 stops the rotation of the operation shaft 4 by the engagement of the engaging projection 46 with the engaging teeth 43.

Splines 47 (FIGS. 2 and 4) are formed at the other end of the operation shaft 4 to be spline-connected to the sun gear S. The length of the spline groove is selected to be longer than the thickness of the teeth of the sun gear S to set up a clutch CL4 as described below.

The ring gear R is spline-connected to the top of the counter shaft 3 to rotate together with the counter shaft 3. In short, the ring gear R constitutes a portion for inputting the ouput power, speed-changed by the main transmission, into the auxiliary transmission.

At least one pinion gear P engaging with the sun gear S and ring gear R is disposed around the sun gear S and rotatably supported on the carrier C.

The carrier C, rigidly holding the axle 52 of the pinion gear P and loosely holding the sun gear S between itself and a flange portion formed on the planetary gear mechanism side of the output shaft 5, is integrally fixed to the output shaft 5 by the axle shaft 52 and a rivet 53, so that it can rotate around the sun gear S.

The output shaft is a hollow member disposed concentrically with the counter shaft 3, with the planetary gear mechanism disposed between the output shaft 5 and the counter shaft 3. The top end of the operation shaft 4 is inserted into the hollow portion of the output shaft 5 so as to be axially slidable and circumferentially rotatable.

Figure 4:
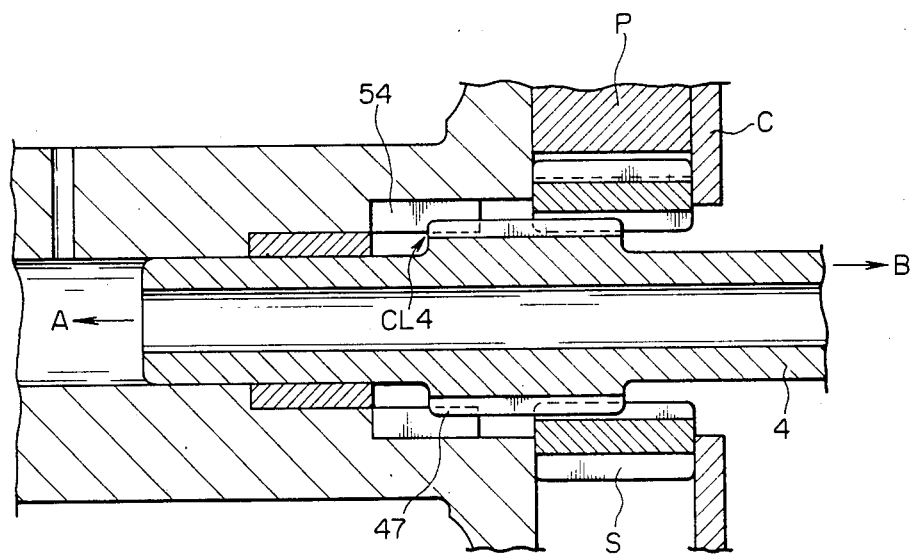
FIG. 4 is a partially sectional view showing the operation of the mechanism.

As illustrated in detail in FIG. 4, splines 54 are formed on the inner surface of the end of the output shaft 5 in the vicinity of the planetary gearing mechanism. The splines 54 project toward the center of the shaft so that the splines 54 can engage with the splines 47 of the operation shaft 4 and thus the sun gear S. The splines 54 and 47 make up the clutch CL4.

The output shaft 5 is rotatably supported on the crank case 1 at its circumference so as to transmit the rotation of the counter shaft 3, speed-changed through the auxiliary transmission, to drive wheels (not shown) through a sprocket 55 and a chain 56.

The gearing operation of the auxiliary transmission Ts is performed by the operation of the sun gear operating mechanism M. That is, as described with reference to FIG. 2, when the engaging wheel 41 engages with the engaging projection 46 of the stopper 44, the operation shaft 4 is consequently fixed to the crank case 1. In this position of the operation shaft 4, its splines 47 do not lock the carrier C to the sun gear S. Since the operation shaft 4 cannot rotate, the sun gear S spline-connected with the operation shaft 4 becomes stationary and the rotation thereof is stopped. The center of the pinion gear P rotates about the sun gear S as the ring gear rotates the pinion gear P about its center. That is the carrier C is rotated by the ring gear R. Accordingly, the rotational output is further reduced through the passage of counter shaft 3→ring gear R→carrier C→output shaft 5. The gear change position in the state where the sun gear is stationary is referred to as "LOW".

Next, when the shift fork F engaged with the fork groove 42 is shifted in the direction of the arrow of FIG. 2 by hand or foot actuation, or the like, to force the operation shaft 4 inwardly, the rotational output is not reduced but is maintained at an equal speed. Details of this operation are shown in FIG. 4. That is, when the operation shaft 4 is forced inwardly in the direction of the arrow A in the drawing, first the control shaft 4 is free to rotate since its engaging teeth 43 no longer engage the stopper 46. Secondly, the splines 47, previously engaging only the sun gear S, also move in the direction of the arrow A and additionally engage with the splines 54 of the output shaft 5, thereby engaging the clutch CL4. At this time, the splines 47 are still engaging with the sun gear S since the grooves of the splines are sufficiently long. Consequently, the sun gear S and the carrier C are fixed to each other by the splines 47 to provide a direct connection therebetween to prevent relative rotation of the carrier C and the sun gear S. As a result, the rotational output inputted to the ring gear R is not reduced by the auxiliary transmission. Also, the operation shaft 4 rotates with the ring gear R and the output shaft 5. The gear change position in this state is referred to as "HIGH". This direct connection state can be realized by relatively fixing two suitably selected members. That is, the sun gear S and the ring gear R may be fixed to each other, or alternatively, the ring gear R and the carrier C may be fixed to each other.

To change the auxiliary transmission to LOW again, the fork F is operated so that the operation shaft 4 is drawn out in the direction of the arrow B of FIG. 4 to thereby engage the engaging teeth 43 of the engaging wheel 41 with the engaging projection 46 of the stopper 44. Then, the engagement with the splines 54 is released so that the sun gear S returns to the stationary position, i.e., LOW. Consequently, the carrier C is free from restriction and the output is reduced again.

CONNECTION BETWEEN MAIN AND AUXILIARY TRANSMISSIONS

The main transmission Tm and the auxiliary transmission Ts are coaxially connected by the counter shaft 3 which serves as an output shaft for the main transmission as well as an input shaft for the auxiliary transmission. Accordingly, as a total transmission system, the two gear shafts are arranged in parallel, and the main shaft 2 has three-stage gears and the counter shaft 3 has three-stage gears and a two-stage planetary gear mechanism. There are six total speed change stages resulting from the product of the three stages of the main transmission and the two stages of the auxiliary transmission (one of which is a lock-up stage as noted above).

If a transmission system having the same number of stages (six stages) as this embodiment were constructed of two sets of multi-stage gears similarly to the conventional case, it would be required to provide six gears per set. According to the present invention, however, the number of gears can be reduced to two clusters of three gears per cluster and one planetary gear mechanism. Moreover, the size of the planetary gear mechanism is generally 1-1.5 times the size of a normal gear. Accordingly, the number of gears of the wider train (counter shaft side) of this system is equal to 4-4.5 standard gear thicknesses as compared with 6 gear thicknesses of the conventional system. That is, the number of gear thicknesses can be reduced by up to 2 to thereby reduce the width of the transmission system correspondingly. Furthermore, if the same number of speed change stages were to be realized by the use of the conventional auxiliary transmission, it would be required to provide three gear sets in the overall transmission system. In the system of the present invention, however, the number of parallel shafts is no more than two, and the length of the system is no more than that of the conventional transmission system, that is, the size in the lengthwise direction is not enlarged. Accordingly, in spite of the fact that this system is a 6-stage transmission system, it is almost equivalent to a 4-stage transmission system in the width thereof and requires only two parallel shafts in the length direction thereof. Therefore, this system is small both in the widthwise direction and in the lengthwise direction as compared with the conventional system.

Figure 5:
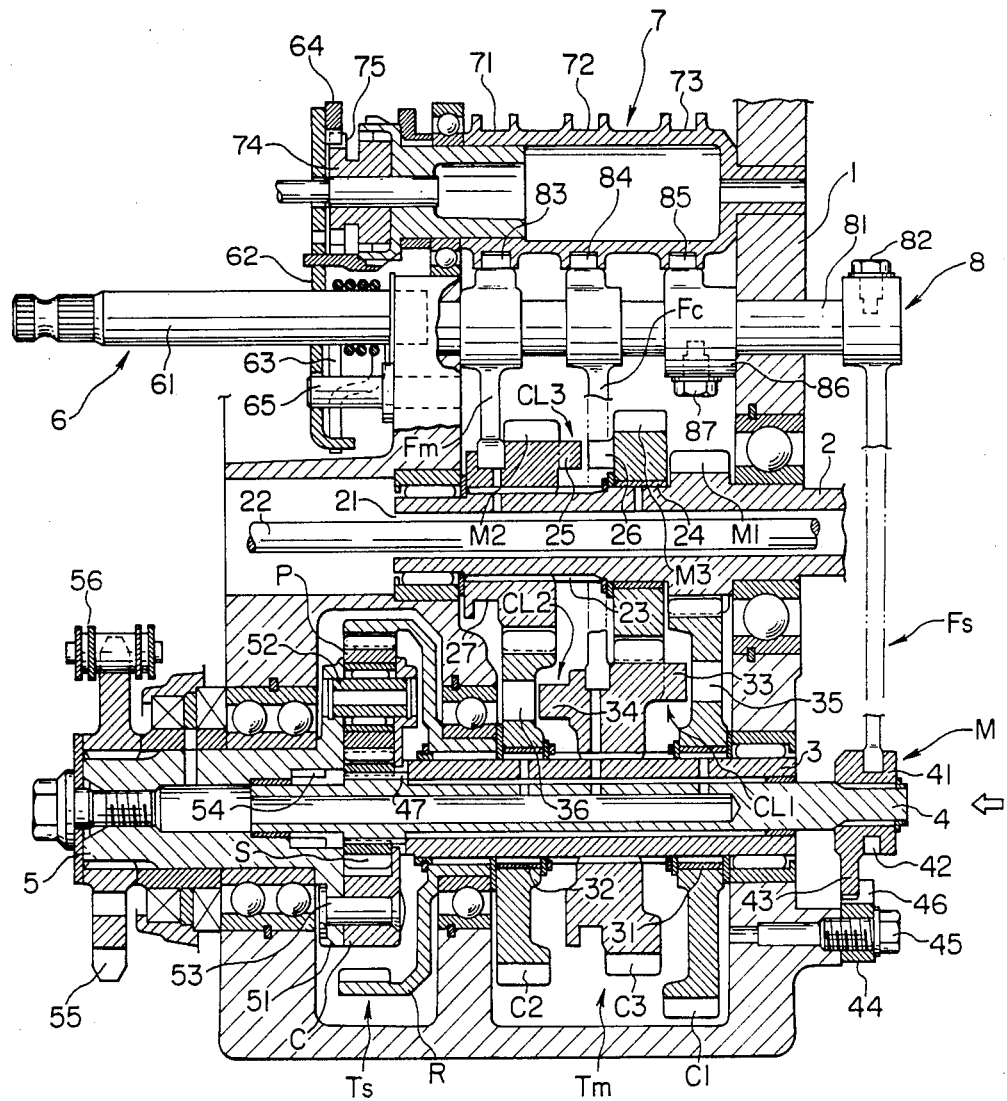
FIG. 5 is a cross-sectional view of a transmission system according to a second embodiment of the invention.

A second embodiment of this invention will be described with reference to FIG. 5, wherein like parts and components are designated by the same reference numerals and characters as those shown in FIG. 2. In FIG. 5, just as in FIG. 2, a fork groove 27 for engagement with a shift fork Fm is formed on the gear M2. The shift fork Fm is one of the operation members. A fork groove 37 for the engagement with a shift fork Fc, which is another of the operation members, is formed on the gear C3.

In FIG. 5, the shifting mechanism is composed of a shift link 6, a shift drum 7, a shift fork 8, (also called Fs) and related elements. The shift drum 7 and the shift fork 8 are rotatably disposed in parallel to the main shaft 2 and the counter shaft 3 within the crank case 1 at a portion lower than the shafts 2 and 3.

The shift link 6 is a mechanism for rotating the shift drum 7 and the like when actuated by a change pedal (not shown) and is composed of a spindle 61, an arm 62, and related elements. Alternatively, the shift drum 7 may be rotated by hand operation.

The spindle 61 has one end to which the change pedal is attached, and the other end, which is rotatably supported by the crank case 1, is parallel to the main shaft 2. The arm 62 of the spindle extends to the end of the shift drum 7 to engage therewith and is welded to the spindle 61. A return spring 63 is wound around the spindle 61 and the opposite ends of the spring 63 are fixed to return edges of the arm 62 so as to normally bias the spindle 61 and the arm 62 to rotate in a predetermined direction. A latch tooth 64 is welded to the top of the arm 62. The arm 62 is provided with a guide groove engaged with one end of a guide shaft 65 which is disposed in parallel to the spindle 61 and which has its other end inplanted in the crank case 1.

The shift drum 7 is a cylinder, rotatably supported by the crank case 1, and has three circumferential cam grooves 71, 72 and 73 formed on its outer side. The grooves 71, 72 and 73 run generally circumferentially but also each undulate in a prescribed manner in the longitudinal direction of the shift drum 7. A cam 74 is fixed to one end of the shift drum 7 in the vicinity of the arm 62 and the latch tooth 64 engages with teeth 75 formed on the circumference of the cam 74.

The shift fork 8 moves in the axial direction of the shift drum 7 as the shift drum 7 rotates in order to select the combination of gears to thereby change over the speed change positions. The shift drum 7 controls the engagement of the clutches CL1, CL2 and CL3, the sun gear operating mechanism M, and the like. A fork shaft 81 is disposed on a slightly different level from that of the spindle 61 and is rotatably mounted to the crank case 1 in parallel to the main shaft 2. Three shift forks are attached onto the fork shaft 81. Two of these forks are the main shift fork Fm for the gears mounted on the main shaft and the counter shift fork Fc for the gears mounted on the counter shaft. Both of the forks Fm and Fc are slidable in the axial direction of the fork shaft 81. The main shift fork Fm operates the clutch CL3 and the counter shift fork Fc operates the clutches CL1 and CL2. An auxiliary shift fork Fs for the auxiliary transmission is rigidly fixed to the fork shaft 81 by a bolt 82. One end of each of the shift forks Fm, Fc and Fs extend respectively toward the gears of the main and counter shafts 2 and 3 and the sun gear operating mechanism M. The tips of these ends engage respectively with fork grooves 27, 37 and 42. Pins 83 and 84 are fixed to the other ends of the shift forks Fm and Fc, and the tops of the pins 83 and 84 engage respectively with the cam grooves 71 and 72 of the shift drum 7. A fixed member 86 includes a pin 85 having an end engaged with the cam groove 73. The fixed member is fixed by a bolt 87 to a portion of the fork shaft 81 in the vicinity of the cam groove 73.

When the change pedal is operated to turn the spindle 61, the arm 62 turns in the same direction so that the cam 74 together with the shift drum 7 rotates by the engagement of the latch teeth 64 with the teeth 75. Thus, the pins 83, 84 and 85 engaging respectively with the cam grooves 71, 72 and 73 move along the shift drum 7 in the axial direction. Owing to the movement of the pins 83 and 84, the shift forks Fm and Fc axially slide on the fork shaft 81 so as to cause the gears M2 and C3 engaged with the tops of the shift forks Fm and Fc to move axially to engage or disengage the clutches CL1, CL2 and CL3.

On the other hand, owing to the movement of the pin 85, the fork shaft 81 itself moves axially to move the shift fork Fs in the axial direction, since the shift fork Fs and the fixed member 86 are both fixed to the fork shaft 81. Thus, the operation shaft 4 moves within the counter shaft 3 to engage and disengage the clutch CL4, and to fix the sun gear S in the manner described above.

Accordingly, if the shift order is set beforehand, the main and auxiliary transmissions can be systematically operated in the sequence set by the single shift drum 7.

The sequence of the combination of the speed change positions of the main and auxiliary transmissions can be set as desired. Examples of methods for setting the sequence of combinations include a sequence in which the auxiliary transmission is alternately changed over between LOW and HIGH with respect to each of the speed change stages of the main transmission. In another sequence, the speed change stages of the main transmission are successively operated with the auxiliary transmission fixed in either its LOW and HIGH setting, and then the speed change stages of the main transmission are operated again successively after the auxiliary transmission has been changed over. Yet another sequence could be irregular in its combinations in that, on occasion, the auxiliary transmission is changed over after several stages of the main transmission are sequentially changed over, and on occasion, the main transmission and the auxiliary transmission are regularly changed over, and so on. The most suitable shift sequence is selected from those methods in accordance with the motive power characteristics or other characteristics of the motor.

While a preferred embodiment has been described, it should be understood that the invention is not limited to the specific embodiment and various modifications may be made.

For example, any of the known gearing type multi-stage transmissions may be selected, including synchronization type transmissions. If necessary, the main transmission may contain a reverse gear change.

As to the auxiliary transmission, any of the ring gear R, the carrier C and the sun gear S may be selected as the reaction member, the drive member or the output. For example, the system may be modified to include an overdrive mechanism by driving the carrier C. The structure for stopping the rotation of the operation shaft in the sun gear operating mechanism may be made through a partly splined connection between the counter shaft and the operation shaft. Alternatively, braking may be effected through the use of a brake having a servo mechanism interlocked with the shifting mechanism.

A plurality of planetary gearing mechanisms may be connected. In this case, it is apparent that the system of the present invention can be made compact as compared with a system constituted of multi-stage gears realizing the same number of speed change stages.

The connection between the main and the auxiliary transmissions may be realized through any suitable means, and the auxiliary transmission may be disposed in front of the main transmission (on the motive power side). Moreover, it is not always necessary to make the gear shaft of the main transmission and the input (output) shaft of the auxiliary transmission coaxial with each other. Since the auxiliary transmission can be made compact, an auxiliary transmission having an axis different from that of the main transmission may be effectively disposed within a dead space so long as such a dead space exists in the vicinity of the main transmission.

The transmission system according to the present invention is applicable to not only motorcycles but also to motor tricycles or the like in which a reduction in the size of the transmission system is highly desirable, both in the widthwise direction and in the lengthwise direction.

According to the present invention, twice the number of speed change stages of the main transmission can be realized by connecting the auxiliary planetary gear transmission to the multi-stage gearing type main transmission. Therefore, compared with the conventional system having the same number of speed change stages, the number of gears per shaft can be reduced, and the width of the transmission system can be further reduced while the size in the lengthwise direction is not enlarged. Accordingly, the cycle body layout or the like for securing the necessary bank angle can be greatly simplified. Furthermore, since the weight is reduced by the reduction in the number of gears, it is possible to make improvements in running performance, in comfortable handling, and in economy of manufacture.

What is claimed is:

1. A transmission system, comprising:
    a main transmission, comprising: first and second parallel shafts, said first shaft comprising an input shaft mounting a first plurality of gears, and said second shaft comprising a counter shaft mounting a second plurality of gears respectively in mesh with said first plurality of gears;
    at least one of said first plurality of gears being rotationally fixed to said first shaft, at least another of said first plurality of gears being axially slidable along said first shaft to engage another of said first plurality of gears;
    an auxiliary transmission comprising;
    a planetary gear set coupled to said counter shaft, and comprising:
    a ring gear having an internally toothed surface and being coaxial with and rotationally fixed to said counter shaft;
    a sun gear coaxial with said counter shaft and having toothed inner and outer circumferential surfaces;
    a carrier coaxial with said counter shaft; and
    at least one pinion gear rotatably supported on an outer portion of said carrier and engaging said ring gear and said sun gear; and
    a rotatable control shaft longitudinally slidable within said counter shaft and said sun gear, and being non-rotatable with respect to said sun gear, said control shaft being movable between a first longitudinal position where said control shaft engages a stopping member for braking said control shaft and said sun gear, and a second longitudinal position where said control shaft locks said sun gear to said carrier and disengages from said stopping member.

2. A transmission system as recited in claim 1, further comprising:
    first means for shifting a speed of said main transmission;
    second means for shifting a speed of said auxiliary transmission; and
    control means having a single mechanical input for controlling said first and second shifting means.

3. A transmission system as recited in claim 2, wherein said control means comprises a shift drum having a plurality of grooves on its outer surface and being rotated by said mechanical input means and wherein each of said first and second shifting means comprises at least one pin, each engaged with one of said grooves and slidable in a longitudinal direction of said shifting drum.

4. A transmission system as recited in claim 2, wherein said second shifting means includes means for locking said sun gear to said carrier.

5. A transmission system as recited in claim 1, further comprising:
    a plurality of shifting forks for longitudinally moving said control shaft and at least one of said gears of each of said first and second plurality of gears;
    a rotatable shifting drum having grooves on its outer surface for engaging and longitudinally moving each of said shifting forks.

* * * * *